US008917854B2

(12) United States Patent
Castellani et al.

(10) Patent No.: US 8,917,854 B2
(45) Date of Patent: Dec. 23, 2014

(54) SYSTEM TO SUPPORT CONTEXTUALIZED DEFINITIONS OF COMPETITIONS IN CALL CENTERS

(71) Applicant: Xerox Corporation, Norwalk, CT (US)

(72) Inventors: Stefania Castellani, Meylan (FR); Tommaso Colombino, Grenoble (FR); Benjamin Vincent Hanrahan, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 73 days.

(21) Appl. No.: 13/736,409

(22) Filed: Jan. 8, 2013

(65) Prior Publication Data

US 2014/0192970 A1 Jul. 10, 2014

(51) Int. Cl.
*H04M 3/00* (2006.01)
*H04M 3/51* (2006.01)
*G06Q 10/06* (2012.01)

(52) U.S. Cl.
CPC ....... *H04M 3/5175* (2013.01); *G06Q 10/06398* (2013.01)
USPC ................................ 379/265.06; 379/265.03

(58) Field of Classification Search
CPC ..... G06Q 30/02; G06Q 10/06; H04M 3/5175; H04M 3/42221; H04M 3/5233; H04M 3/51
USPC ........................................ 379/265.03, 265.06
See application file for complete search history.

(56) References Cited

U.S. PATENT DOCUMENTS

| | | | |
|---|---|---|---|
| 6,324,282 B1 | 11/2001 | McIllwaine et al. | |
| 6,459,787 B2 | 10/2002 | McIllwaine et al. | |
| 6,628,777 B1 | 9/2003 | McIllwaine et al. | |
| 6,775,377 B2 | 8/2004 | McIllwaine et al. | |
| 7,398,224 B2 | 7/2008 | Cooper et al. | |
| 7,412,402 B2 | 8/2008 | Cooper et al. | |
| 7,596,507 B2 | 9/2009 | Gibson et al. | |
| 7,853,006 B1 | 12/2010 | Fama et al. | |
| 7,864,946 B1 | 1/2011 | Fama et al. | |
| 7,949,552 B2 | 5/2011 | Korenblit et al. | |
| 8,046,254 B2 | 10/2011 | Kosiba et al. | |
| 2001/0049084 A1 | 12/2001 | Mitry | |

(Continued)

FOREIGN PATENT DOCUMENTS

EP 0 632 363 A2 1/1995

OTHER PUBLICATIONS

Reeves, B. et al. "Total Engagement: Using Games and Virtual Worlds to Change the Way People Work and Businesses Compete", Harvard Business Press, 2009, pp. 1-4.

(Continued)

*Primary Examiner* — Rasha Al Aubaidi
(74) *Attorney, Agent, or Firm* — Fay Sharpe LLP

(57) ABSTRACT

A system, method, and device for forming contextualized competitions in a work environment are disclosed. The system includes a performance metric computation component which computes performance metrics, a visualization component which generates a visual interface for display to a supervisor, and a processor which implements the components. The method includes receiving information related to a set of agents operating in a work environment. A first aggregated value for a first performance metric and a second aggregated value for a second performance metric are computed. The first and second values are visualized, and a predicted effect on the second performance metric when the first performance metric is altered is visualized. The device serves as a decision-making support tool including a plurality of control mechanisms for altering at least one performance metric and displaying the predicted effect on another.

23 Claims, 10 Drawing Sheets

(56) References Cited

U.S. PATENT DOCUMENTS

| | | | |
|---|---|---|---|
| 2006/0233121 A1 | 10/2006 | Cooper et al. |
| 2006/0233348 A1 | 10/2006 | Cooper et al. |
| 2006/0233349 A1 | 10/2006 | Cooper |
| 2007/0195944 A1 | 8/2007 | Korenblit et al. |
| 2007/0198322 A1 | 8/2007 | Bourne et al. |
| 2007/0198325 A1 | 8/2007 | Lyerly et al. |
| 2007/0198329 A1 | 8/2007 | Lyerly et al. |
| 2007/0206768 A1 | 9/2007 | Bourne et al. |
| 2007/0220365 A1 | 9/2007 | Castellani et al. |
| 2007/0243936 A1 | 10/2007 | Binenstock |
| 2008/0045339 A1 | 2/2008 | Lin |
| 2008/0181389 A1 | 7/2008 | Bourne et al. |
| 2008/0267386 A1 | 10/2008 | Cooper et al. |
| 2009/0138342 A1 | 5/2009 | Otto et al. |
| 2010/0227675 A1 | 9/2010 | Luxton et al. |
| 2011/0040155 A1 | 2/2011 | Guzak et al. |
| 2011/0270771 A1 | 11/2011 | Coursimault et al. |
| 2011/0273739 A1 | 11/2011 | Grasso et al. |
| 2011/0310428 A1 | 12/2011 | Ciriza et al. |
| 2012/0016711 A1 | 1/2012 | Kosiba et al. |

OTHER PUBLICATIONS

Mehrotra, et al. "Call Center Simulation Modeling: Methods, Challenges, and Opportunities", Proc. 2003 Winter Stimulation Conference, 2003, pp. 135-143.

Arcaris, Aug. 16, 2011, http://thenextweb.com/las/2011/08/26/how-chilean-born-arcaris-is-bringing-gamification-to-call-centers/ , Retrieved Nov. 18, 2011, pp. 1-6.

Castellani, S., et al. "Designing Technology as an Embedded Resource for Troubleshooting", 2009, CSCW, vol. 18, Issue 2, pp. 1-28.

Martin, et al. "Making the Organisation Come Alive: Talking Through and about the Technology in remote banking", Human-Computer Interaction, 2003, vol. 18, Nos. 1 &2, pp. 111-148.

Call Center Games. http://www.callcentergames.com, 2011, Performance Connections, Inc., pp. 1-8.

Oneill, et al. "From Ethnographic Study to Mixed Reality: A Remote Collaborative Troubleshooting System", Proc. of CSCW 2011, Mar. 19-23, 2011, pp. 1-10.

Oneill, et al. "When a Little Knowledge Isn't a dangerous Thing", Proc. of CHI 2011, May 7-12$^{th}$, pp. 1-10.

Grasso, et al. "The Personal Assessment Tool: A System Learning Communities of Users Shared Printers for Providing Environmental Feedback", ICMLA, Dec. 12-14, 2010, pp. 1-6.

GamificationOrg (2011). http://www.gamification.org/wiki/Gamification ; Last Modified Sep. 25, 2011, pp. 1-6.

GamificationEncyclopedia (2011) The Gamification Encyclopedia, http://gamification.org/wiki/Encyclopedia, last modified Nov. 4, 2011, pp. 1-5.

Rypple.(2011) http://rypple.com; pp. 1-2.

Modelmetrics. (2011) "Gaming the Call Center", Apr. 19, 2011, http://www.modelmetrics.com/joel-dubinskys-blog/gaming-the-call-center/ , pp. 1-5.

U.S. Appl. No. 13/308,859, filed Dec. 1, 2011, Grasso, et al.

Colombino, et al. "Agentville: supporting situational awareness and motivation in call centres", Proc. of COOP '12 Conference, 2012, pp. 1-15.

Deterding, et al. "Gamification: Using Game Design Elements in Non-gaming contexts" CHI 2011 Workshop on Gamification, pp. 1-4.

Finley, K. "How 'Gamification' Can Make Your Customer Service Worse". http:www.wired.com/wiredenterprise/2012/11/gamification-customer-service/, 2012, p. 1-4.

Aldor-Noiman, et al. "Workload Forecasting for a call center: Methodology and a Case Study", The Annals of Applied Statistics, 2009, vol. 3, No. 4, pp. 1403-1447.

Brown, et al. "Statistical analysis of a telephone call center: a queueing-science perspective", The Wharton School, pp. 1-57, Nov. 9, 2002.

SYSTEM TO SUPPORT CONTEXTUALIZED DEFINITIONS OF COMPETITIONS IN CALL CENTERS

BACKGROUND

The exemplary embodiment relates to enhancing workplace performance and the motivation of individual agents and finds particular application in connection with a system and method for forming contextualized competitions in a work environment, such as a call center.

Call centers commonly use gaming techniques to motivate agent performance in the workplace. These games take the form of challenges or competitions which act as a more interactive alternative to activity-based compensation models and performance management strategies for motivating agents. Activity-based compensation models, for example, allow for individual agent performance to be measured but at the same time do not provide contextual information regarding overall call center performance. Properly designed games have the potential to motivate individual agents while also taking into account the performance weakness and strengths of the entire call center.

The games currently employed by call centers are designed to drive performance according to particular performance metrics or services according to organizational requirements. Because the particular performance metrics and/or services are not changed on a regular basis, the games tend to target the same skill set and consequently the same subset of agents tends to win. Those agents outside of the winning subset may perceive the game as unfair and believe that they do not have a realistic chance to win. Current games are also not implemented in a technological manner. Game scoreboards are typically wall displays that are not updated frequently. Both agents and supervisors lack dynamically updated displays which are beneficial to for enhanced situational awareness and engagement between call center agents and supervisors.

Various methods have been proposed for modeling and simulating activities in call centers for the purposes of call routing, staffing, lesson assignment, and scheduling. Some of these methods include calculating performance metric data indicative of agent performance and studying data correlations. A review of how a call center environment may be gamified by using games and virtual worlds is found in Reeves, B., and Read, J. L., "Total Engagement: Using Games and Virtual Worlds to Change the Way People Work and Businesses Compete," Harvard Business Press (2009). However, mechanisms for providing more dynamic, engaging competitions, or those which may take into account regularly updated performance metric targets are still needed.

There remains a need for a system and method for forming contextualized competitions in a work environment which can lead to improvements in overall workplace performance and the motivation of individual agents.

INCORPORATION BY REFERENCE

The following references, the disclosures of which are incorporated herein in their entireties, by reference, are mentioned:

The following relate to modeling and simulating activities in call center environments for the purposes of call routing, staffing, lesson assignment, and scheduling: Mehrotra, V. and Fama, J., "Call Center Simulation Modeling: Methods, Challenges, and Opportunities," in Proc. 2003 Winter Stimulation Conference, Chick, S, Sanchez, P. K., Ferrin, D., and Morrice, D. J., eds., pp. 135-143 (2003); U.S. Pat. Nos. 7,853,006; 7,864,946, entitled SYSTEMS AND METHODS FOR SCHEDULING CALL CENTER AGENTS USING QUALITY DATA AND CORRELATION-BASED DISCOVERY, by Fama, et al.; U.S. Pat. No. 8,046,254 and U.S. Pub. No. 20120016711, entitled SYSTEM AND METHOD FOR GENERATING FORECASTS AND ANALYSIS OF CONTRACT CENTER BEHAVIOR FOR PLANNING PURPOSES, by Kosiba, et al.; U.S. Pub. Nos. 20070206768; 20080181389, entitled SYSTEMS AND METHODS FOR WORKFORCE OPTIMIZATION AND INTEGRATION, by Bourne, et al.; U.S. Pub. No. 20070198322, entitled SYSTEMS AND METHODS FOR WORKFORCE OPTIMIZATION, by Bourne, et al.

The following relate to collecting and/or visualizing performance metric and other data from call center agents: U.S. application Ser. No. 13/308,859, filed on Dec. 1, 2011, entitled SYSTEM AND METHOD FOR ENHANCING CALL CENTER PERFORMANCE, by Maria Antonietta Grasso, et al; U.S. Pat. Nos. 7,412,402; 7,398,224, and U.S. Pub. Nos. 20080267386; 20060233348; 20060233121, entitled PERFORMANCE MOTIVATION SYSTEMS AND METHODS FOR CONTACT CENTERS, by Cooper; and U.S. Pub. No. 20060233349, entitled GRAPHICAL TOOL, SYSTEM, AND METHOD FOR VISUALIZING AGENT PERFORMANCE, by Cooper.

The following relate to notification systems which depend on call center operations other than for designing competitions: U.S. Pub. Nos. 20070198329; 20070198325, entitled SYSTEM AND METHOD FOR FACILITATING TRIGGERS AND WORKFLOWS IN WORKFORCE OPTIMIZATION, by Lyerly, et al.; U.S. Pat. No. 7,949,552 and U.S. Pub. No. 20070195944, entitled SYSTEMS AND METHODS FOR CONTEXT DRILLING IN WORKFORCE OPTIMIZATIONS, by Korenblit, et al.

BRIEF DESCRIPTION

In accordance with one aspect of the exemplary embodiment, a system for forming contextualized competitions in a work environment includes a performance metric computation component and a visualization component. The performance metric computation component receives information related a work environment and computes a first aggregated value for a first performance metric and a second aggregated value for a second performance metric. The visualization component generates a visual interface for a supervisor which displays a representation of the first and second aggregated values at a current time, a control mechanism for altering the first and second values, and a predicted effect on the second value when the first value is altered. A processor implements the performance metric computation component and the visualization component.

In another aspect, a method for forming contextual competitions in a work includes receiving information related to a set of agents operating in a work environment. A first aggregated value for first performance metric and a second aggregated value for a second performance metric are computed, based on the received information. The first and second values are visualized at a current time, and a predicted effect on the second performance metric when the first performance metric is altered is visualized.

In another aspect, a decision-making support tool for forming contextual competitions in a work environment includes a display device which displays at least one region which displays a representation of a plurality of performance metrics that are each aggregated over a population and a plurality of control mechanisms disposed on the region, each of the plurality of control mechanisms enabling a respective one of the performance metrics to be altered. A user input device enables a user to adjust one of the control mechanisms to alter a respective one of the performance metrics and cause the display device to display a predicted effect on at least one other of the performance metrics when the first performance metric is altered. A processor implements the tool.

DETAILED DESCRIPTION

Figure 1:
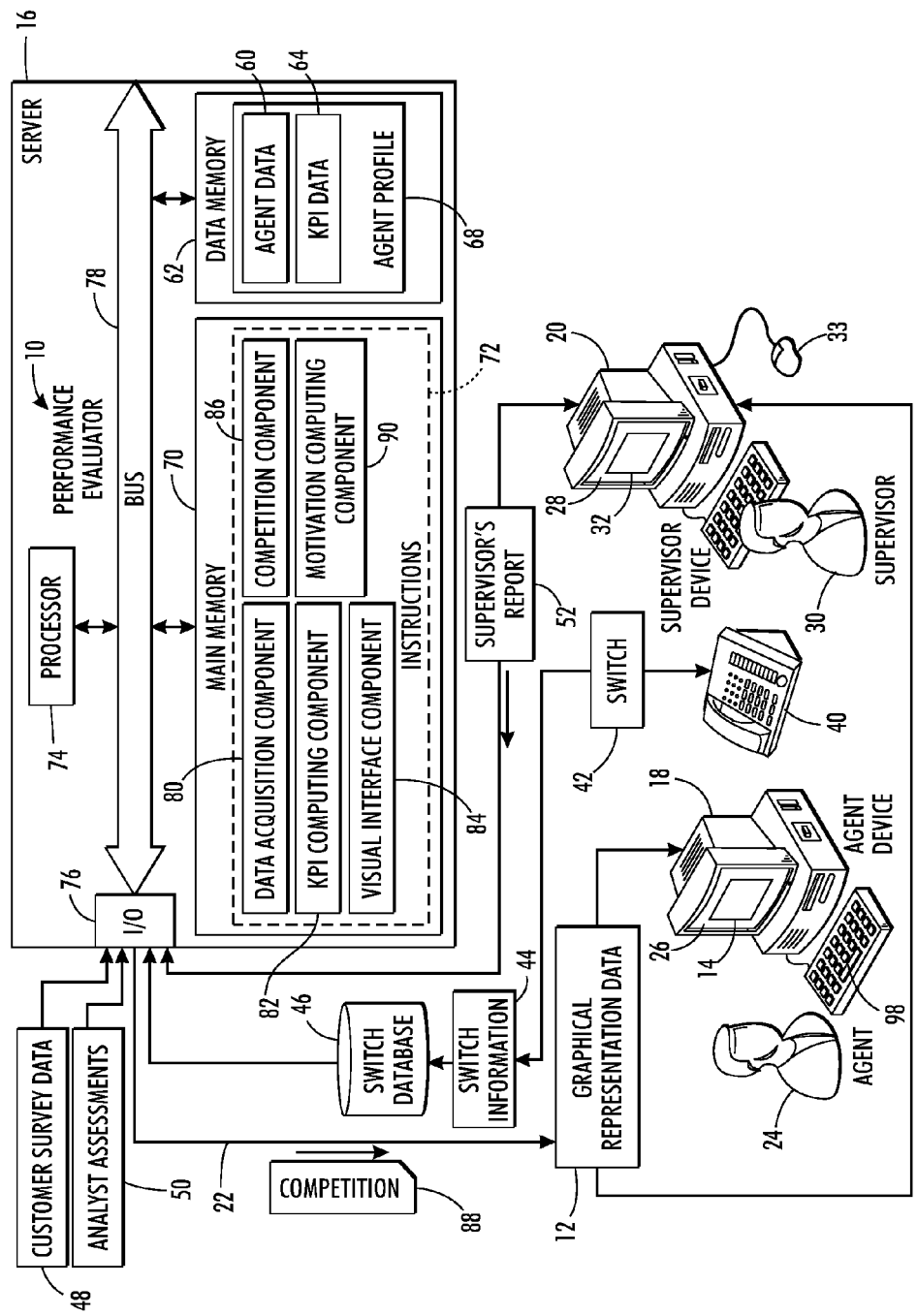
FIG. 1 is a functional block diagram of a system for designing contextualized competitions in a work environment in accordance with one aspect of the exemplary embodiment.

Aspects of the exemplary embodiment relate to a system and method for forming contextualized competitions in a work environment, such as a call center. Such competitions can enhance workplace performance and individual agent motivation in the work environment. The exemplary work environment is described in terms of an inbound call center, where agents (human workers) receive calls from customers which are assigned to them immediately as they become available, as long as the calls stack up in a call center queue. It is to be appreciated, however, that the system is also applicable to outgoing call centers where agents are initiating calls to customers and to potential customers, and to other work environments where productivity and/or quality measures can be computed.

Agent performance in call centers can be measured according to performance metrics, which can be tied to Key Performance Indicators (KPIs). In order to improve the performance metrics as well as the motivation and morale of the agents, many call centers provide incentives in addition to a base salary or activity-based compensation mechanisms, which may take the form of competitions among the agents. Competitions may pit individual agents, teams, or entire call centers against each other for prizes and rewards that range from the nominal (a few extra minutes break time) to the substantial (flat screen TVs and laptops). These competitions are performance related, that is, they are tied to specific KPIs. For example, a competition could be based on the largest improvement of a performance metric for a given day or week.

However, not all agents have the same skill set, and not all agents have the same margins for improvement on the same metrics. For example, challenging agents with a low value on a specific performance metric to lower that performance metric even more is not likely to yield significant improvements. The agents are not likely to have margins of improvement on the desired performance metric that will benefit the call center as a whole. They are also unlikely to appreciate being pushed on performance metrics for which they are already performing as expected.

The exemplary system and method can yield improvements to both overall performance of call centers and individual agent motivation. This is particularly due to useful visual indications for contextual game design provided to supervisors, including: current values of correlated performance metrics, the predicted effect when correlated performance metrics are altered, and/or potential success rates of proposed competitions when considering characteristics particular to individual agents. The exemplary system and method assists call center supervisors in visualizing the state of various KPIs, as well as forming competitions at the appropriate time to effect changes in the same KPIs. The functionalities may be applied at different levels of scope, i.e. team, group or call center level. In particular, the method considers aggregated KPIs, i.e., performance metrics that are aggregated (e.g., averaged) over a population (e.g., team) of agents. While reference is often made herein simply to "KPIs" it is to be appreciated that aggregated KPIs are generally being considered.

The term "supervisor" is used herein to refer to any decision-maker(s) charged with responsibility for monitoring the performance of a group of people and to provide competitions for motivating them appropriately, and may include managers, IT personnel and the like.

Using the exemplary tool, call centers can integrate advanced game mechanics into a dynamic and engaging work environment, as this may allow supervisors to define competitions that are more contextualized to the current situation. Contextualized game designs are more effective than standard designs as they consider both overall call center goals and the motivational characteristics and goals of individual agents. Contextualized game design shifts the focus on performance metric targets chosen by a priori knowledge to targets chosen in view of continually updated information on call center performance and individual agent motivation.

The system disclosed herein includes a server side, through which data on call center activities are collected and processed, and a client side, through which agents and supervisors can visualize a call center work environment. During a competition, the agents are able to visualize overall call center statistics as well as their individual progress on their own display. Supervisors are able to visualize contextual information related to the call center on their own display, from which they may design new competitions for a set of agents working in a call center.

FIG. 1 illustrates an exemplary system for forming contextualized competitions in a work environment. The system includes a server-side and a user side. At the server side, a performance evaluator 10 optionally generates visual interface data 12 for display as an agent visual interface 14. This agent visual interface 14 displays a summary of an agent's performance in relation to the goals of a proposed competition on the client/user side. The performance evaluator 10 is hosted wholly or partly on a server computing device 16 which communicates with a set of agent client devices 18 and one or more supervisor client devices 20, via a network 22. Only one agent client device 18 is shown for ease of illustration, but it is to be appreciated that a large number of such agent client devices may be linked to the server 16 via the network 22. The network 22 can be a wired or wireless network, e.g., a local area network or a wide area network, such as the Internet.

The visual agent interface 14 is displayed to an agent 24 on a display device 26 of the respective client device 18. The performance evaluator 10 is also configured for displaying a similar visual interface 28 to a supervisor 30 for a team of agents on a display device 32 of the respective supervisor client device 20. While the same visual agent interface 14 could be provided to all operators, in the exemplary embodiment, agents 24 on a team are each provided with an individualized representation of their own respective performance characteristics, which is a slightly different visual interface from that received by the supervisor 30 of the team, through which the supervisor can view information which assists in designing competitions which are suitable for motivating a group of agents. The agent visual interface 14 for the agent may show an overall aggregation of the agent's situation in terms of each of a plurality of performance metrics and other characteristics, and their evolution over time. The supervisor's visual interface 28 shows the distribution of these characteristics over the team, while also providing access to the information about the individual agents in his or her team. The visual interface 28 also provides a mechanism for designing competitions to improve performance metrics, specifically, to improve performance metrics aggregated over a population of agents, such as the supervisor's team. The supervisor's client device 20 includes a user interface device 33 for inputting commands to the processor and display device 32 of the supervisor's device, which allows the supervisor to interact with the visual interface 28. The user interface device 33 can include, for example, a mouse, joystick, keyboard, keypad, combination thereof, or the like.

Typically, the agents 24 are grouped into a team of 10 to 15 workers to which a supervisor 30 is assigned. The agents may receive periodic (typically weekly and monthly) feedback from the supervisor on their performance. As will be appreciated, a group of the supervisors may also have a supervisor, sometimes referred to as an operations manager, who may also be provided with a representation (not shown) analogous to visual interface 28. A large call center may have a "floor" of up to 800 or 900 agents, or more, operating at the same time.

Each agent is provided with a telephone device 40 on which he receives incoming calls and/or on which he may be able to initiate calls in some cases. Information 44 about the length of each call and time between calls can be generated, based on the state of a call center switch 42 associated with the telephone, which detects whether the agent's telephone is in use or not. The information 44 may be collected and stored in a switch database 46 in memory accessible to the performance evaluator 10. The performance evaluator 10 may also receive, as input, customer survey data 48, derived from customer reviews of the agent 24 as a result of prior telephone interactions with customers, and/or analysts' assessments 50 made by listening to the agents calls. A supervisor's report 52 on the agent, generated by the agent's supervisor 30, may also be received by the performance evaluator 10.

The exemplary visual interface 28 can provide a supervisor 30 with some or all of the following features:
  1. A visualization of the current state of KPIs.
  2. Proving alerts to the supervisor 30 when an issue with one or more KPIs is detected;
  3. Visualizing the predicted effect on related KPIs when a selected KPI is manipulated on the visual interface 28, in particular, visualizing the effect on aggregated values of each of a set of KPIs, which are aggregated over a population of agents, rather than for a single agent;
  4. Communicating the difficulty of a proposed competition;
  5. Displaying the possible contributions for individual agents to provide an indication of the possible "success" of the competition;
  6. Notifying the supervisor 30 of an automatically triggered competition for KPIs that need improvement; and
  7. Providing the supervisor 30 with suggestions for altering on-going competitions to fit the needs of the call center better.

As previously noted, the performance of each agent 24 may be measured according to each of a set of KPIs. One or more of the KPIs may be derived, at least in part, directly from the call center telephone switch 42. One or more of the KPIs may be derived, at least in part, from customer survey data 48 and/or the assessments 50 performed by quality analysts who listen to recorded phone calls and "score" the agents' performance on a set of pre-defined categories (e.g., "average", "very good", "excellent"). Examples of KPIs derived from the telephone switch include the Average Handle Time (AHT), which represents the average time an agent spends on a phone call with a customer (or performing a task in other contexts), and the After Call Work time (ACW), which represents the average time between ending one call (task) and starting on the next. Another KPI may be the average transfer rate (T), which represents the average percentage of calls which the agent transfers to another agent or supervisor. A quality (Q) KPI may be based on the customer survey data 48 and/or analyst assessment scores 50. As will be appreciated, these performance measures are intended to be exemplary only, and the system is not limited to any specific measures of the agents' performances. The call center as a whole is typically expected to keep its aggregate average KPI values (aggregated over all the agents) within a certain range defined between upper and lower threshold values (or in some cases, to meet only an upper or a lower threshold value). Agents are therefore in turn expected to manage their phone calls so that their individual average KPI values meet the same thresholds or agent-specific thresholds.

The server side 16 of the exemplary system provides for the collection and aggregation of the relevant information, e.g., KPI data. For example, agent data 60, which includes the customer survey data 48, information 44 retrieved from the database 46, analyst assessments 50, and supervisor's report 52 (or data derived from these data), may be stored in data memory 62 of the server computer 16. Performance metric (KPI) data 64 is generated by the system, based on the agent data 60, and used by the performance evaluator 10 to generate the graphical agent visual interface 12 and the supervisor interface 28. The agent data 60 and performance metric data 64 for the agent may be stored, together with the agent's skill-related information, as an agent profile 68.

Figure 2:
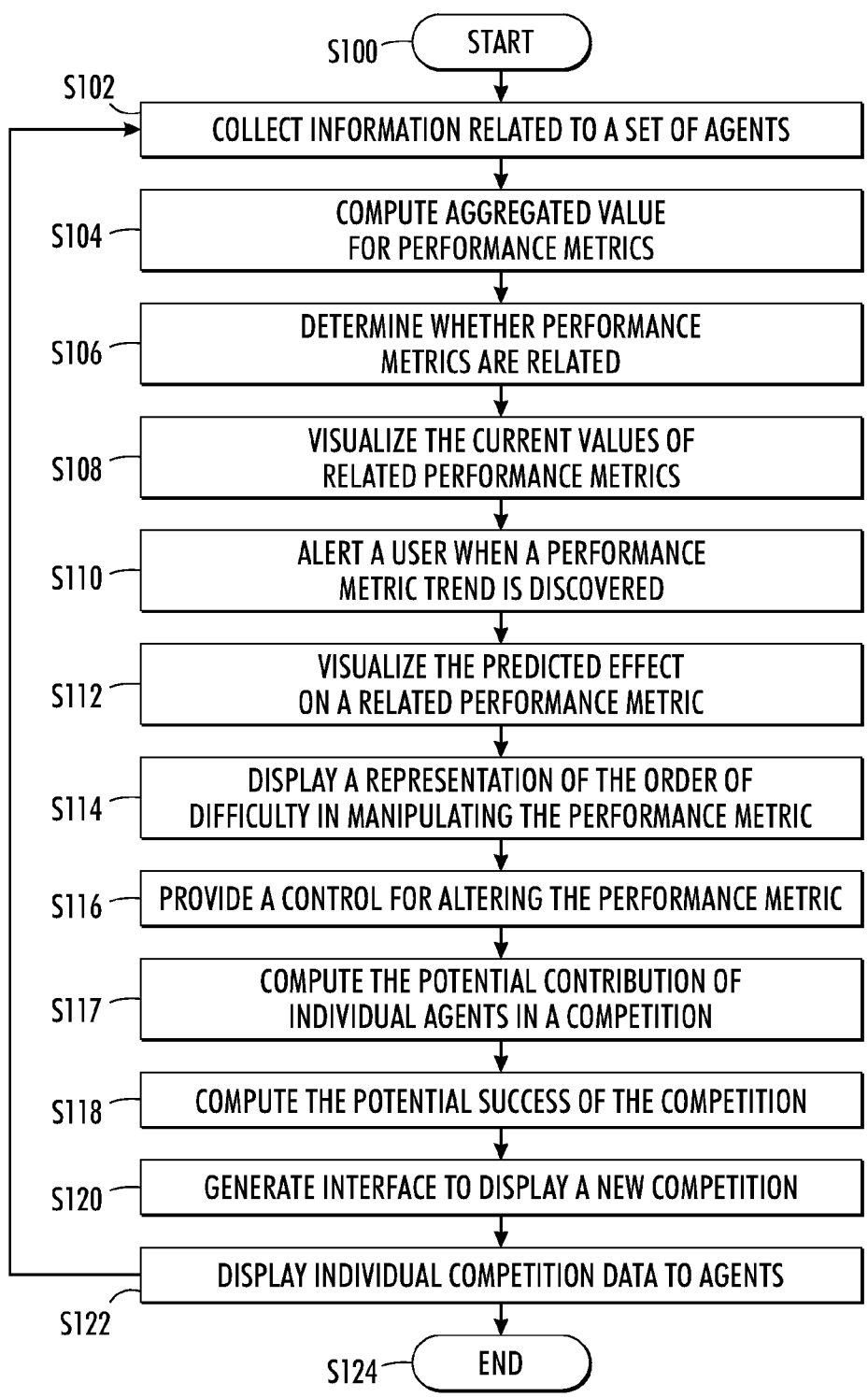
FIG. 2 is a flow chart illustrating a method for designing contextualized competitions in a work environment in accordance with another aspect of the exemplary embodiment.

The exemplary server computer 16 may include main memory 70 which stores instructions 72 for implementing the exemplary method described with respect to FIG. 2, and a processor 74, in communication with the memory 70, for executing the instructions. One or more input/output devices 76 may be provided for receiving the data 44, 48, 50, 52 and for outputting the graphical representation data 12 and the like. Hardware components 62, 70, 74, 76 may communicate via a data/control bus 78.

In an exemplary embodiment, memory 70 stores a data acquisition component 80 for acquiring data 44, 48, 50, 52 from various sources and storing it in memory 62, from which the agent data 60 is extracted. A performance metric (KPI) component 82 generates KPI values 64 periodically for the agent individually and aggregated KPI values for the team as a whole, based on the stored agent data 60. A representation generator 84 generates and updates the visual interface data 12 periodically, based on the aggregated KPI values 64 and stored thresholds for the aggregated KPI values, for display on the supervisor's display device. The representation generator 84 may also generate and update the individual agent visual interface data 12 periodically, based on the agent's respective KPI values 64 and stored thresholds for the KPI values.

In one embodiment, a competition component 86 automatically generates new competitions 88 for example, when the system detects that one or more KPI is approaching a value at which a threshold value for that KPI is not met. This means, for example, that in the case where the KPI threshold is a minimum value, the detected KPI value is exhibiting a trend towards falling below the minimum, which can be based on a recent history of detected values but may not yet have reached the threshold. Similarly, for a KPI threshold which establishes a maximum KPI value for a particular KPI, the observed trend is towards exceeding the maximum value.

Competitions 88 may also be configured to be automatically triggered by the system when other specific situations are detected. The competitions may first be proposed to the supervisor 30 for validation, or received from the supervisor for presenting to the agent, or a combination thereof.

In one embodiment, a motivation calculating component 90 of the system calculates the potential individual contributions of individuals. Motivation calculation component 90 may include inputting values for each of a set of explanatory variables into an improvement prediction function. This function outputs a prediction of the amount of improvement that an individual may exhibit when presented with a specified motivation, such as a competition. In one embodiment, the input of this function can be at least one or all of the following explanatory variables:

1. An agent's past reactions to competitions (e.g., the extent to which the agent improves one or more KPIs when given a specific KPI target);
2. How much room for improvement the agent has, e.g., how close he is to a target KPI set by the competition;
3. Whether or not the agent has competing goals with a proposed competition 88 (e.g., whether an improvement in one KPI is predicted to impact another KPI that the agent needs to improve to meet the KPI threshold); and
4. The amount by which the agent has recently increased or decreased his or her performance on one or more KPIs.

The predictive function can be, or be based on, a regression function, such as a Poisson regression function, modeled using standard analysis techniques. The aim of Poisson regression analysis is to model a response variable denoted Y, as the estimate of an outcome using some or all explanatory variables. The logarithm of the response variable Y is linked to a linear function of explanatory variables according to EQN. 1:

$$\log_e(Y) = \beta_0 + \beta_1 X_1 + \beta_2 X_2 + \beta_n \quad \text{(EQN. 1)}$$

where $\beta_n$ are coefficients and $X_n$ are explanatory variables. The typical Poisson regression model therefore expresses the log outcome rate Y as a linear function of a set of predictive variables. The linear function according to EQN. 1 allows for the outcome rate Y to be output as a quantitative estimate of competition success. According to EQN. 1, output variable Y may also be expressed as $Y = (e^{\beta_0})(e^{\beta_1 X_1})(e^{\beta_2 X_2}) \ldots (e^{\beta_n X_n})$.

The output of the Poisson regression model, outcome rate Y, can also provide a quantitative measure of the predicted amount of change in a targeted KPI predicted for a given challenge. The explanatory variables $X_n$ may include related KPIs with corresponding coefficients $\beta_n$ that increase or decrease the log likelihood of the predicted change. Other explanatory variables may include the motivational characteristics of individuals of entire call center groups which affect the targeted KPI. In yet another embodiment, a similar Poisson regression analysis is performed to quantitatively determine the predicted impact a competition 88 will have on an entire call center, i.e., on a larger population than the supervisor's own team.

The server computer memory 62, 70 may be separate or combined and may represent any type of non-transitory computer readable medium such as random access memory (RAM), read only memory (ROM), magnetic disk or tape, optical disk, flash memory, or holographic memory. In one embodiment, the memory 62, 70 comprises a combination of random access memory and read only memory. In some embodiments, the processor 74 and memory 62 and/or 70 may be combined in a single chip. The network interface 76 allows the computer to communicate with other devices via the computer network 22, such as a local area network (LAN) or wide area network (WAN), or the internet, and may comprise a modulator/demodulator (MODEM).

The digital processor 74 can be variously embodied, such as by a single-core processor, a dual-core processor (or more generally by a multiple-core processor), a digital processor and cooperating math coprocessor, a digital controller, or the like. The digital processor 74, in addition to controlling the operation of the computer 16, executes instructions 72 stored in memory 70 for performing the server side operations of the method outlined in FIG. 2.

The agent device 18 and supervisor device 20 may be similarly configured to the server computer and may each comprise one or more specific or general purpose computing devices, such as a PC, such as a desktop, a laptop, palmtop computer, portable digital assistant (PDA), server computer, cellular telephone, tablet computer, pager, combination thereof, or other computing device capable of executing instructions for performing the client side operations of the exemplary method. The agent device 18 and supervisor device 20 may have memory, a processor, and an input/output device for communicating with other devices via the network 22. The agent device 18 may also include an agent user input device 98, analogous to user input device 32, such as a keyboard, keypad, touchscreen, cursor control device, or combination thereof, or the like, for inputting commands to the respective processor and display 14.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

With reference now to FIG. 2, a method for forming contextualized competitions in a work environment is illustrated in accordance with one aspect of the exemplary embodiment.

The method begins at S100.

At S102, information 60 is collected (by the data acquisition component 80) related to a set of agents operating in a work environment and stored in memory 62.

At S104, an aggregated value for each of a plurality of performance metrics is calculated (by the KPI computing component 82), based on the acquired agent data 60 for a group of agents. The aggregated value calculation may include aggregating the values for each of the plurality of performance metrics, wherein the performance metric values are calculated at a plurality of times within a selected time period. Calculating relevant performance metrics from information related to a set of agents is discussed below as "Key Performance Indicator Data."

At S106, a correlation measure between two (or more) of the plurality of aggregated performance metrics is calculated, which is an indicator of how strongly one aggregated KPI measure depends on another one or more others of the aggregated KPIs (or the corollary, how independent one KPI is of one or more other KPIs). The computing of the correlation measure between the first and second performance metrics may be used to determine whether the two metrics meet a threshold level of relatedness. In one embodiment, the correlation measure is calculated by determining a Pearson coefficient. The Pearson coefficient is a measure of the strength of a linear dependency between two variables. The Pearson coefficient ranges from −1 to 1, with 1 indicating a perfect linear dependency and −1 indicating an inverse dependency. The computed dependencies are visualized graphically through the user interface 28. For example, performance metrics with a Pearson correlation coefficient above a predetermined threshold of relatedness may be grouped together on the visual interface 28 and considered related. In an exemplary embodiment, the Pearson correlation coefficient threshold has an absolute value of 0.6. Correlations between KPIs may be treated transitively. For example, if AHT is correlated to CSAT and CSAT is correlated to After, all three of performance metrics AHT, CSAT, and After will be grouped together on the interface 28 as related performance metrics.

At S108, the current values of related performance metrics are displayed on the visual interface 28.

At S110, an alert may be generated by the system when an issue with a performance metric is determined. In one embodiment, an issue with the performance metric may be determined by interpolating the last n data points taken for the aggregated value of the performance metric and identifying a trend towards a threshold value for the performance metric. For example, n=at least 2, or at least 3, such as 3-5 data points. The threshold value may be determined by the call center and/or the service level agreement. In another embodiment, an alert is generated when the performance metric is trending away from a threshold value to indicate unusually successful gains in the respective performance metric.

At S112, the predicted effect on at least one (second) performance metric that is dependent on a selected (first) performance metric is computed and displayed on the visual interface 28. It should be noted that the predicted effect on one, two, three, or more related performance metrics may be displayed at once on the same visual interface 28. The predicted effect may be determined by calculating a measure of correlation between the selected performance metric and the related second performance metric(s). In one embodiment, the Pearson coefficient is used to determine the predicted effect on related performance metrics, similar to S106.

The slope of a regression line computed between selected and related performance metrics may be used to determine the predicted effect of a change in one performance metric on the at least one other related performance metric. In particular, for every single unit of change in a manipulated performance metric, the affected other performance metric will move at the rate of 1*(slope of the regression line). For example, if AHT changes by one unit and the slope of the regression line between AHT and After is 0.5, then After will increase by half a unit.

If there are multiple performance metrics that could influence an affected performance metric, such as if CSAT is being manipulated and CSAT correlates with both AHT and After, but After also correlates with AHT, whichever has the highest correlation coefficient will determine which regression line is used to determine the predicted effect on the at least one related performance metric. The inputs for these correlations may be constrained to historical performance metric values. In other embodiments, multiple regression analysis is performed which allows correlations between multiple performance metrics to be used to predict the effect of a change in one performance metric on others.

At S114, the visual interface 28 may generate a visual representation of the degree of difficulty involved in manipulating the selected performance metric. The visual representation may include a color of increased intensity/difference in color or other variation along the bar 112 which represents a higher degree of difficulty. The degree of difficulty may be calculated according to the slope of a regression line drawn between the selected and related performance metrics. Measures of correlation such as the Pearson coefficient may also be used to determine degree of difficulty, as in S106, assuming a linear relationship between two different performance metrics.

In one embodiment, the degree of difficulty is determined according to a non-linear model when performance metrics are inter-correlated. If three performance metrics correlate with each other, the highest correlation coefficient from a linear regression between them is no longer chosen. The non-linear model includes, e.g., a curve fitting data points from three or more related performance metrics. Difficulty may be defined as the distance Between: 1) a peak value indicated on the non-linear relationship between two Performance metrics, and 2) a value of one of the performance metrics according to the non-linear relationship when the other performance metric is fixed at a current value.

The user interface 28 allows the supervisor to see when a modification to one KPI, through manipulation of its control 110, will cause another related KPI to change by displaying the movement of that KPI's control 111, which may be a positive effect or a negative effect, depending on the computed dependency.

At S116, the selected performance metric is manipulated, e.g., by the supervisor using the cursor 33 (or by the system) and detected by the visual interface component 84. The selected value of the performance metric can be used to propose a competition, by the competition component 86. The competition generally seeks to provide motivation for the supervisor's team to achieve the aggregated KPI value that was selected by the supervisor through manipulation of its respective control 112.

At S117, the potential contribution of individual agents to achieve the competition is computed, by the competition component 86. The potential contribution predicts the ability of each agent to meet the competition goals. In one embodiment, the potential contribution of individual agents in the competition can be modeled according to a Poisson regression analysis as in EQN 1. In particular, the log of potential contribution P may be modeled as a linear function of explanatory variables. Explanatory variables may have values which represent one or more of (1) the current situation of their activities (including their schedules), skills, performance (typically the average value(s) of the metric(s) selected for the competition), and objectives and (2) the behavior of the agent in the past with respect to similar kinds of competitions, (3) how much room for improvement the agent has for the performance metrics involved in the competition, (4) whether or not the agent has competing goals with the competition, (5) and the amount the agent's performance has recently improved or decayed.

Calculating the potential contribution of individual agents allows managers to optimize the motivational aspects of the competition. For example, if low performers are the primary contributors to poor performance, a leader board competition may not be as effective as a competition that rewards all participants for achieving a set target. As another example, the manager could decide to have a large number of winners, instead of only a few, since this could motivate more people to participate in future competitions, while also potentially encouraging the improvement of collective performance. For example, if an improvement of AHT is desired for the whole call center, this could be a global goal for a number of agents so that the effort is distributed among them.

At S118, a predicted success of the competition is computed by the competition component 86. In one embodiment, the predicted success of the competition can be modeled according to Poisson regression analysis which models the predicted success of the competition S according to a linear function of explanatory values pertinent to each individual participating in the competition. Explanatory values may include the potential contribution of individual agents calculated at S117.

At S120, the system causes the visual interface 28 automatically to display a new competition based on the predicted effect visualized at S112 and the predicted success of the competition computed at S118. The new competition 88 may be formulated by the competition component 86. The suggested competition may be the indication for an entirely new competition or provide advice on how an on-going competition may be modified to fit the performance needs of the call center better and the motivations of individual agents. The supervisor may be requested to validate the proposed competition, which is received by the system.

At S122, the currently chosen competition is displayed to each agent on the supervisor's team, together with the individual agent performance data. This may occur on the agent visual interface 14 to provide dynamically updated individual data and enhance call center engagement between supervisors and agents. Dynamic updates are enabled by allowing the method to return to S102, whereby information is recollected and the method for forming contextualized competitions in a work environment is repeated.

In the case that the method is not repeated by proceeding at S122 to S102, the method ends at S124.

The method illustrated in FIG. 2 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 2, can be used to implement the method for visualizing performance data.

Further details on the system and method will now be discussed.

Key Performance Indicator Data

The KPI data 64 that are used by the system are dynamically collected by calling up various call center data sources and systems. Examples of KPI data 64 useful to a call center application may include some or all of the following:

1. Call center Service Level Agreement (SLA), i.e., the call center threshold KPIs, e.g., the minimum and maximum acceptable length for a call. The SLA may be agreed upon with a client (the outsourcing company for which the center is run).
2. Agent specific data (Switch data 44):
    a. Agent status information (e.g., handling a call, available or unavailable presence at desk);
    b. Call specific data:
        i. Start and duration of the current call, hold time, dead air time, transfer, etc.;
        ii. Average Handle Time (AHT). Handle time is calculated from the moment the call is connected to the moment the agent or the customer hangs up, including any time spent on hold or in conference. AHT is the cumulative average of this value over a predetermined time period, such as the Agent's shift or a longer period, such as a week or month;
        iii. After call work time (ACW). As for AHT, this is an average over a predetermined time period. It measures the average time between calls (unless the agent is on a scheduled break); and
        iv. Calls per hour (CPH). The total number of calls handled in an hour. Once again, this may be an average value.
        v. Transfer Rate (T). The percentage of calls transferred from the agent to another operator for handling. The upper threshold may be 10-15% of calls.
3. Call quality and topic data:
    a. Call timings: Meta data about a call obtained on the fly analyzing the call audio content: talk time, dead air time, etc. These may also be average values;

b. Customer satisfaction (CSAT): A satisfaction score assigned to a call on the base of a survey done some time after the call itself;

c. Agent quality scores (AQS): these quality assessments may be carried out on a periodic, e.g., a weekly basis, where a quality assurance officer listens in to an agent call and marks them in a detailed manner on a number of categories related to, for example, policy adherence, system use, technical capabilities, soft skills, and so forth. This score is usually a percentage and agents are typically expected to score 95-100% to achieve acceptable levels of quality. This may also be a KPI threshold in the SLA.; and d. A set of keywords from a predefined list that are assigned to the call when CSAT score are assigned, describing the call content.

e. In some embodiments, an overall quality score (Q) may be an aggregation of two or more quality scores, such as CSAT and AQS scores.

4. Scheduling data:

a. Agent scheduling data: planned shifts and breaks.

The call center KPI thresholds can be more or less directly related to individual call center agent's KPI thresholds. For example, the constraints on the acceptable call length are translated into minimum and maximum threshold values for AHT. Other agent KPI thresholds can be related to parameters such as the agent's adherence to the schedule, the transfer rate, quality, etc.

In addition to the data above, the system may also collect call-based feedback from the agents. For example, agents may be required to or select to give feedback on each call they handle (or on calls selected periodically), indicating, for example, the call difficulty, how well they think they handled the call, and/or whether the topics were difficult for them. This information may be given to supervisors to provide feedback on how their agents are doing and can help the system and the supervisors to identify training needs.

Visual Interface

Figure 3:
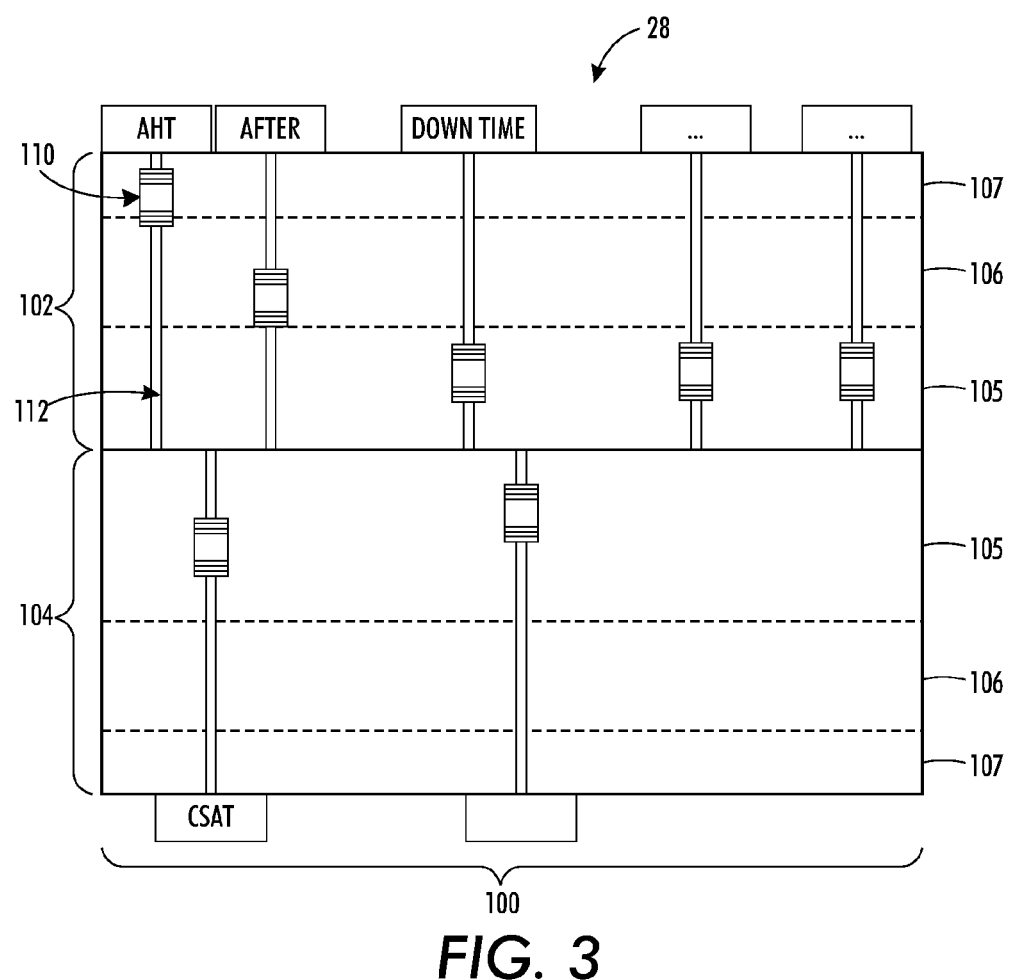
FIG. 3 is a graphical representation of a visual interface with current performance metric values in accordance with another aspect of the exemplary embodiment.

With reference now to FIG. 3, the visual interface 28 is configured to display a decision making support tool 100 for the supervisor. The support tool 100 is illustrated with current performance metric values and horizontal regions.

In one embodiment, the tool 100 is bifurcated with a plurality of performance metric controls 110 disposed on the interface which are each movable in a respective displayed range along a respective bar 112. The bifurcated tool 100 includes a first horizontal region 102 for displaying performance metrics where a lower value is generally desired, e.g., after call work time ("After"). One or more performance metrics may be displayed on the first horizontal region 102. The aggregated KPIs represented in this region all have a threshold value (e.g., a call center constraint) which agents should not exceed.

The bifurcated tool 100 also includes a second horizontal region 104 for displaying performance metrics where a higher value is generally desired, e.g., CSAT. One or more performance metrics may be displayed on the second horizontal region 104. The aggregated KPIs represented in this region all have a threshold value (e.g., a call center constraint) which agents should not fall below.

The tool 100 assists supervisors within the call center to construct and define competitions. Particularly, these competitions may have the aim both to improve the performance of the call center and to motivate the agents to participate actively in the competitions. More precisely the support tool 100 may be adapted to perform one or more of the following:

1. Automatically detect when the values of one or more aggregated KPI(s) trend towards violating a predetermined threshold (constraint(s)). The constraint(s) may be defined by at least one of the terms of the service level agreement (SLA) and the call center itself. The tool 100 also notifies the supervisor accordingly to suggest a design for a competition; and 2. Provide supervisors with both (1) the estimated effect of the competition on related aggregated KPIs and (2) information on current agents' performance and an estimation of "realistic" improvements. The estimated effect may be determined either by correlations detected by the system for forming contextualized competitions in a work environment or by the definition of the supervisors themselves. The estimation of realistic improvements may be calculated based on several factors including the compatibility of improvements to the selected KPIs within the agent's current individual objectives and skills.

The decision-making support tool 100 enables a supervisor to dynamically define competitions on the basis of current and past performance data collected in the call center. The tool 100 is designed to enhance the definition and targeting of competitions in the call centers.

With continuing reference to FIG. 3, the value of related aggregated KPIs at a current time can be visualized on visual interface 28. The interface 28 serves to inform supervisors as to the impact of a proposed change in one aggregated KPI on related aggregated KPIs. When a selected aggregated KPI is manipulated, e.g., by moving control 110 up or down on interface 100 along sliding member 112, KPIs that are related to the selected KPI will also change to represent the effect that the change in the selected KPI has on related KPIs.

Related KPIs can be grouped together to make viewing of the changes easier and help supervisors construct an accurate picture of how the KPIs are related. In addition to AHT, other related KPIs are represented on FIG. 3, such as "After" for After call work time, and "CSAT" for Customer Satisfaction Survey responses. The number of different KPIs that should be represented on interface 28 due to their relation with each other may range from 2 to 20. In one embodiment, between 5 to 10 related KPIs are represented on interface 28.

The different KPIs represented on interface 28 may be displayed in relation to their established individual thresholds as defined by at least one of the SLA and call center. There are several horizontal regions 105, 106, 107 on bifurcated interface 28 which indicate a different KPI status. Regions 105, 106, 107 are associated with the different states of the KPIs relative to their respective established thresholds. KPI values falling within region 105 are considered to be in a "good" state. KPI values falling within region 106 have not yet violated the established KPI thresholds but are deemed to be in a 'warning' state. KPI values falling within region 107 are currently in violation of the established KPI thresholds. As will be appreciated, the transition between good and warning states may be set by the supervisor/call center or may be a function of the threshold, such as 50% or 70% of its value.

In order to display different KPIs, where each may have different units of measure and/or different threshold values, KPIs may be normalized so that the different thresholds are aligned on the visual interface 28. With reference to FIG. 3, if AHT and CSAT are both performance metrics measured in seconds and AHT violates the SLA at 120 seconds and CSAT violates the SLA at 60 seconds, the same distance on the interface will not represent the same amount of time, but may represent a corresponding proportion of that value.

When an issue with one or more KPIs is detected, the system may alert a supervisor with a visual indicator or a communication as configured by the supervisor. Then the supervisor can start to design a competition with the objective of addressing the detected issue. The supervisor can do this using the system to define the improvements that will be needed on the problematic issues and studying the impact, if any, on other related KPIs.

Figure 4:
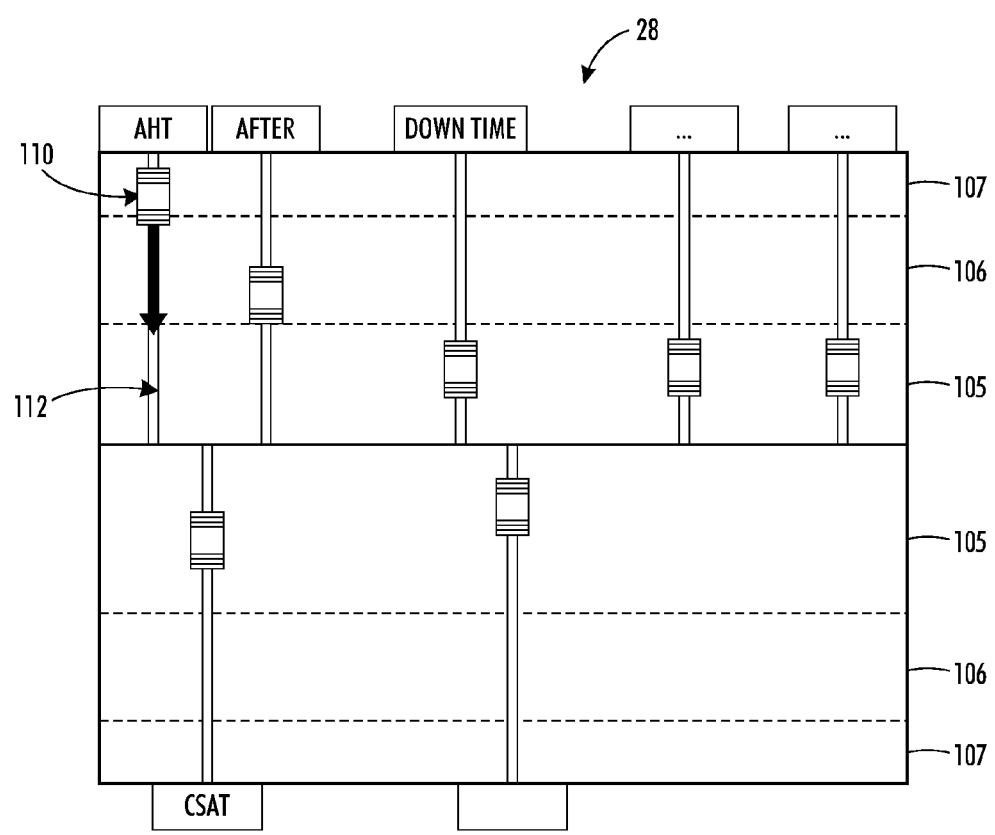
FIG. 4 is a graphical representation of the visual interface with controls moving downward along a sliding member, in an example case.

In order to inform supervisors as to the impact of the proposed change to a KPI on other related KPIs, the user-operable selector controls 111 associated with related KPIs will change, e.g., move up or down a sliding member 112, in the form of a vertical bar, as the supervisor is manipulating the control 110 for KPI that they would like to modify. The interface thus allows for predicted effects on related KPIs to be visualized by the supervisor. The sliding member 112 allows a user to variably select an acceptable level or target level of one (or more) of the KPIs between predetermined maximum and minimum values and thereby influence whether the system is more heavily weighted toward achieving that KPI or towards achieving other KPIs to the potential detriment of that KPI. For example, the user operates the cursor control device 33 (FIG. 1) to click on the user operable control 110 of one of the sliding members 112 (FIG. 4). The user can drag the cursor along the sliding member 112 between the maximum and minimum levels to select a target KPI. The system 110 computes the effect this is predicted to have on related KPIs and automatically moves the corresponding controls 111 to new positions on their respective slider bars 112.

With reference to FIG. 4, the supervisor can initiate the design of a competition 88 by dragging the control 110 along slider 112 to a target value. In this case, AHT is currently above the threshold value (in region 107) and the supervisor is targeting a lower AHT value. The AHT value can be moved from the warning region 107 towards the compliance region 106 or good region 105.

Figure 5:
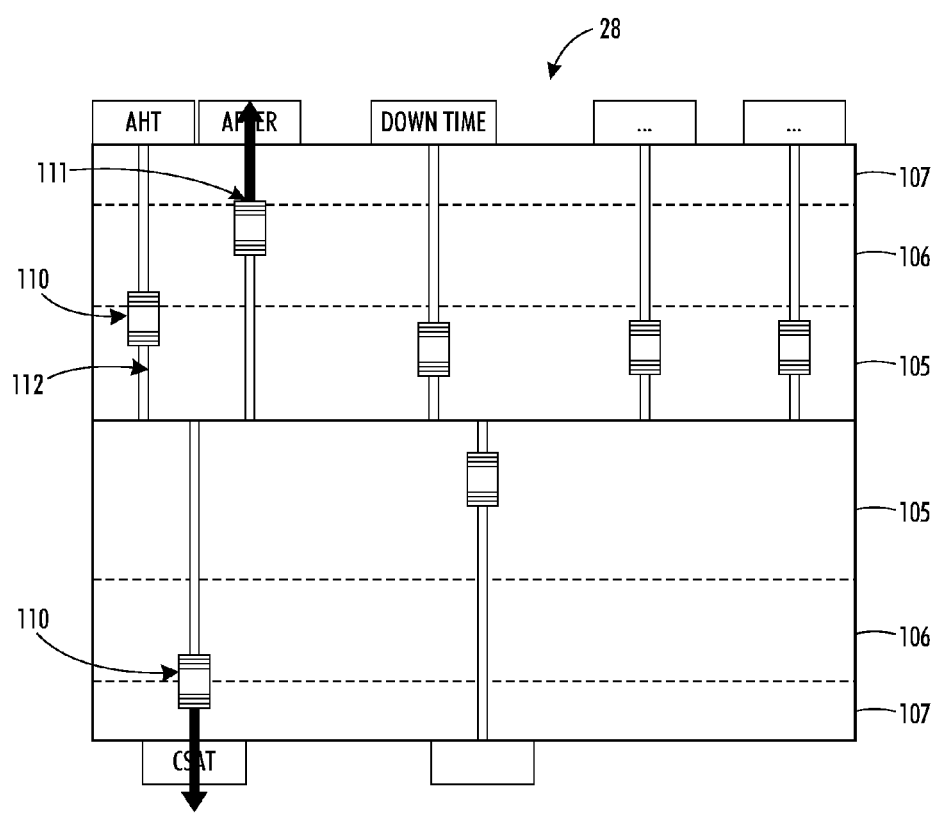
FIG. 5 is a graphical representation of the visual interface showing the predicted effect of lowering the Average Hold Time ("AHT") value on related performance metrics: After call work time ("After") and Consumer Satisfaction (CSAT), in an example case.

With reference to FIG. 5, as the supervisor lowers the control 110 for the AHT KPI, related KPIs are automatically adjusted by the system. For example, CSAT is also lowered while the AFTER KPI is raised. Inclusion of both the selected KPI and related KPIs on visual interface 28 is motivated by information on a single problematic KPI being insufficient for design of an effective call center competition. For example, if a supervisor focused solely on lowering AHT values, improvements on this KPI may come at the cost of negatively impacting the quality of the communication/service, as represented by CSAT. Negative CSATs evaluations also directly affect agents' compensation, as agents' pay rates are usually calculated using a combination of quantitative and qualitative performance measures. CSATs are administered at random to customers after a phone call with a call center agent. One way for agents to minimize the chance of a negative CSAT is to spend as much time as needed with each customer in order to resolve their issue, which in the long run may negatively affect their AHT values. Therefore, it would be useful for the supervisor designing a competition with a goal to lower AHT of the team or call center to understand how AHT may be lowered without unduly impacting the quality of the service. The visual interface 28 displays estimated correlations, if any, between metrics, e.g., AHT and CSAT, based on the analysis of historical data. Then the interface 28 may support the supervisor while making their decision on how to set up a competition to improve a given KPI, e.g. AHT, by providing them with information from these estimations on correlated potential variations of other metrics, e.g., CSAT.

Figure 6:
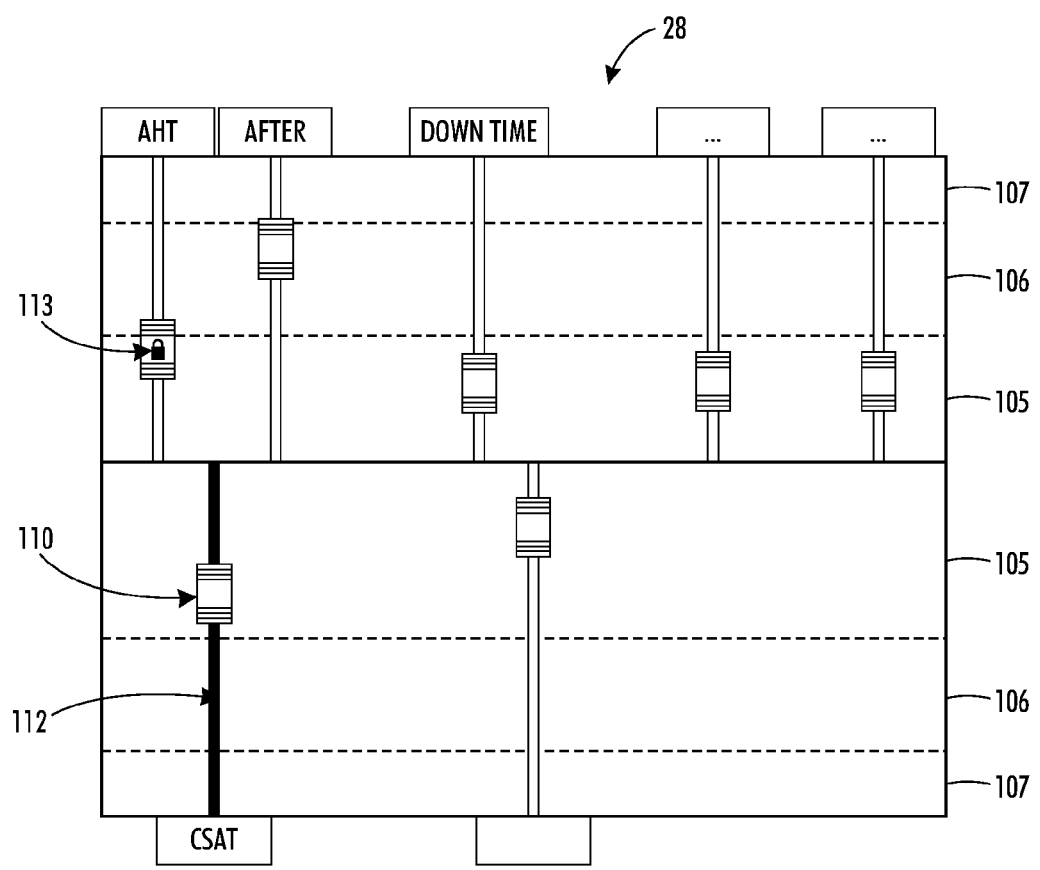
FIG. 6 is a graphical representation of the visual interface communicating the difficulty of moving the CSAT value when AHT value is locked, in an example case.

With reference to FIG. 6, the interface 28 may communicate the relative difficulty of the configured competition in order to prevent managers from initiating competitions that are too difficult to be achieved or to be effective. In this example, the slider bar 112 for the CSAT KPI, which the supervisor is manipulating using control 110, has increased in both hue (e.g., may be colored red) and thickness to indicate increased difficulty. The control 110 for AHT has been locked in position (as illustrated by the lock 113 shown on the AHT control 110), where AHT is a performance metric which is typically affected by CSAT changes. The rate of increase for both the hue and thickness of slider 112 may be calculated from the slope of the linear regression line between CSAT and related KPIs (in this case AHT), similar to the way the predicted effect on related KPIs is calculated. In the case of multiple performance metrics that could influence an effected performance metric, whichever has the highest correlation coefficient will determine which regression line is used to determine the predicted effect.

Figure 7:
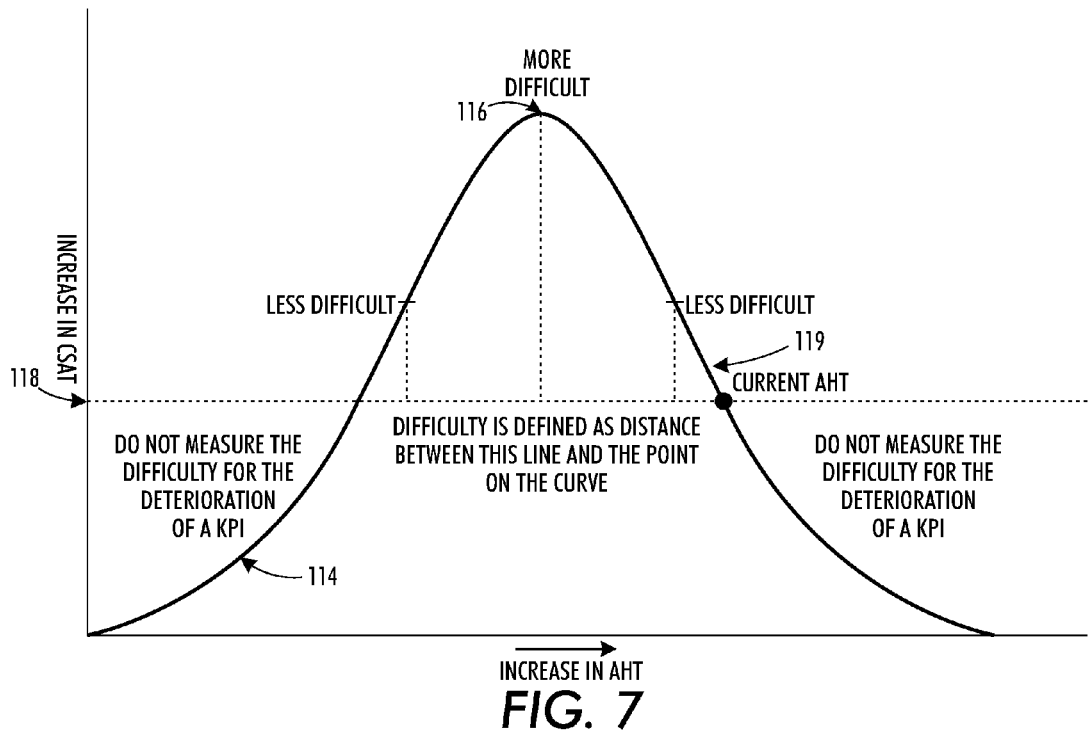
FIG. 7 is a graph of a non-linear model showing the relationship between performance metrics used in communicating difficulty of a competition in accordance with another aspect of the exemplary embodiment.

With reference to FIG. 7, the order of difficulty of a proposed competition is modeled as a non-linear relationship 114. For example, if AHT is decreased while CSAT is fixed at a current value, the difficulty of the competition will increase until the peak of the curve 116 is reached. If AHT is increased beyond 116, the difficulty of the competition will instead decrease. In particular, order of difficulty is shown in FIG. 7 by the vertical distance between: 1) peak 116 on the non-linear relationship 114 and 2) the horizontal line 118 representing the value of CSAT according to non-linear model 114 when AHT is fixed at a current value 119. This non-linear relationship model for determining difficulty of a proposed competition may be applied to other performance metrics besides CSAT and AHT in a similar fashion. The graph shown in FIG. 7 may be presented to the supervisor or simply used to generate the representation shown in FIG. 6, for example, such that as the supervisor moves the CSAT control, the level of difficulty computed according to the function illustrated in FIG. 7 is illustrated on the display.

Figure 8:
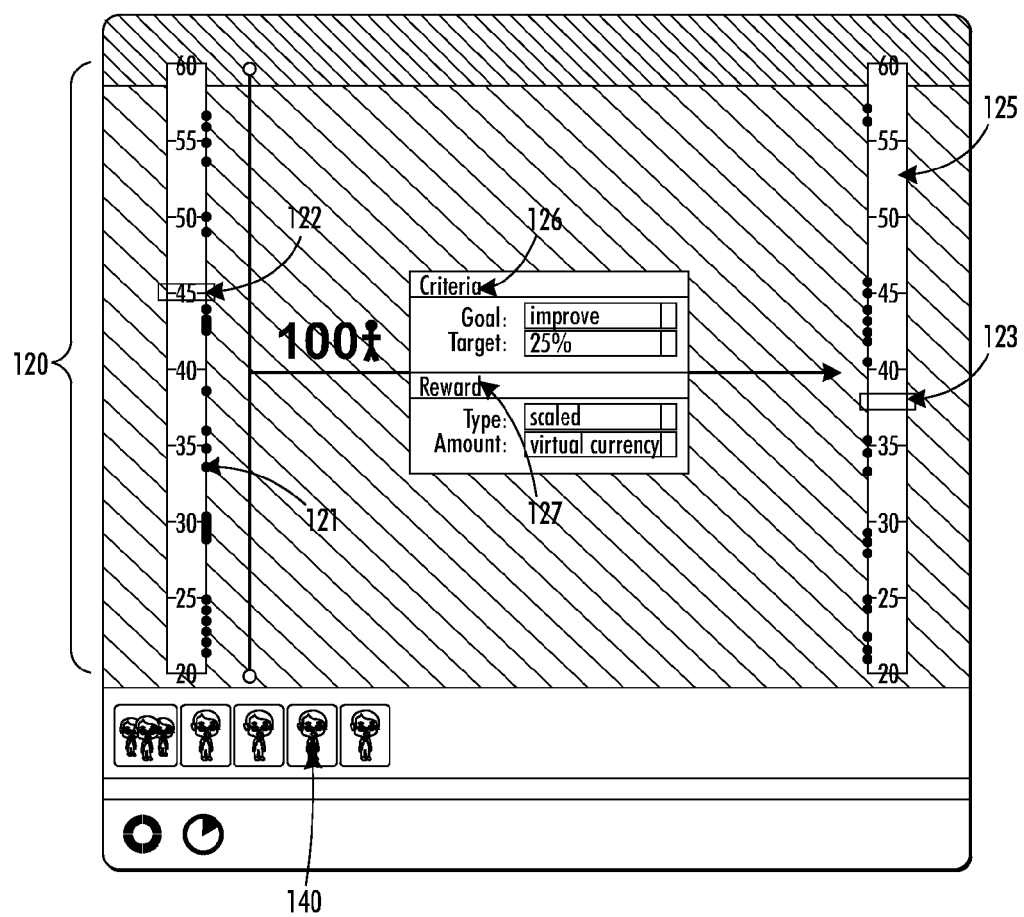
FIG. 8 is a graphical representation of a visual interface indicating the potential contribution of individuals agent within a set of agents in accordance with another aspect of the exemplary embodiment.

With reference to FIG. 8, the supervisor's visual interface 28 may also provide feedback about the predicted contribution of individual agents towards a proposed competition. The interface 28 offers to supervisors a forecast of the agents' motivation to participate actively in the proposed competition. Since all agents do not have the same skill set, the same margins for improvement, nor the same objectives at a given time, motivating agents to participate in competitions may be difficult when the goals and criteria for determining the winners are not dynamically configured to correspond with their individual goals.

Examples of situations where it could be difficult to reconcile individual agents' motivations to achieve their personal objectives with agents' motivation to participate actively in to competitions whose main objective is to improve metrics at the global call center level may include:

1. Agents with a good score for a KPI, e.g., with an already very low AHT, are challenged to improve it further. Agents are not likely to appreciate being pushed on metrics for which they are already performing as expected. Moreover they are not likely to have margins of improvement on that metric that will benefit the call center as a whole.

2. Agents are challenged on a given KPI but among their personal objectives they are meant to improve on other KPIs and the improvements are not compatible. For example, if an agent has as an individual objective for the current week to improve a Quality KPI, then that agent will probably be not very motivated to participate actively in a competition during the current week where the objective is to lower the AHT, since this may impact the agent's Quality score.

3. Agents with very different capabilities are all challenged in the same way on a specific capability.

With continuing reference to FIG. 8, the current distribution of employees 120 can be graphically displayed on visual interface 28, as well as the current 122 and predicted average 123 values of a KPI indicated on a respective vertical bar for the current state 124 and predicted outcome 125 of the competition. The vertical bars 124, 125 thus span the range of agent values for the selected KPI. In this interface, each small dot 121 on the bars 124, 125 represents an agent. The two bars 124, 125 may be colored or otherwise visualized to denote the poor (not meeting the threshold), acceptable, and good regions of the KPI range. For example a color gradient from green (good) at the bottom of the bar 124, 125, to red (poor) at the top may be used to indicate that the top of the bar is worse than the bottom of the bar. Horizontal bars 122, 123 indicate the current average 122 and the projected average 123 after the competition.

The visualization may also show criteria for the completion and the type and nature of the reward an agent may receive for achieving the competition goal(s). The selection of both the criteria mechanism 126 and the reward mechanism 127 can be defined by previously defined global constraints and the supervisor may be able to weigh the predicted effect of the competition on individual agents, shown by the projected average 123, with the chosen competition rewards.

Figure 9:
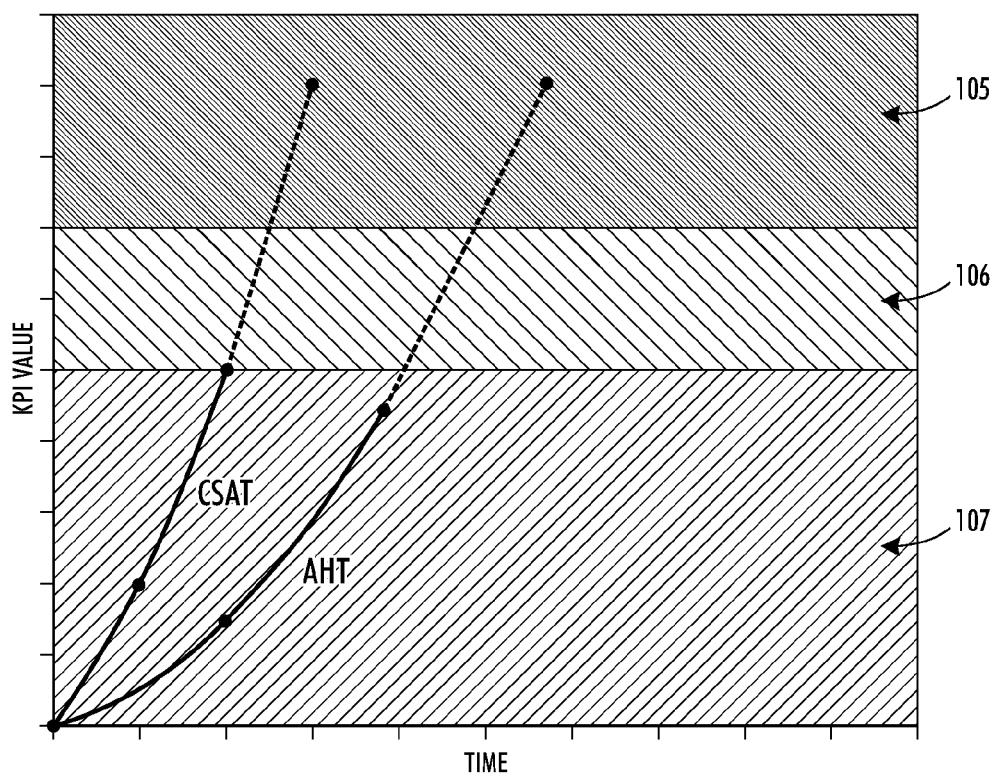
FIG. 9 is a graph of an interpolation to predict values for performance metrics and determine priority, in an example case.

With reference now to FIG. 9, an example of an interpolation for predicting performance metric trends and for determining priority is illustrated. The system for forming contextual competitions in a work environment analyzes trends in performance metrics to predict which performance metrics will become problematic in the near future. The prediction may be performed by interpolating the last n data points of aggregated performance metric data to determine if the performance metric is trending positively or negatively. Once a performance metric has been established to be trending negatively (i.e., towards not meeting the threshold), a priority can be assigned to it relative to other downwardly trending performance metrics. Once this priority is assigned, an appropriate competition focusing on the highest priority performance metric(s) may be suggested by the competition computation component 86 and displayed on the visual interface 28. For example, FIG. 9 illustrates that CSAT will not meet the threshold (i.e., be in region 105) sooner than AHT, so improving CSAT is given the higher priority in designing a competition.

Likewise, the system can also help operation managers to adjust on-going competitions. For example, if AHT is already at an acceptable level and CSAT has reached below the warning threshold, an on-going competition to lower AHT may not only be ineffective but could be further damaging to CSAT. Therefore, the AHT competition could be restructured into a competition that improves CSAT scores.

The example interpolation of FIG. 9 shows that not only is there a more immediate need for a CSAT competition, show by the relatively steeper slope of the CSAT curve, but also, that an existing competition on AHT might expedite the deterioration of CSAT. Regions 105, 106, 107 indicate the status levels towards which the KPIs are trending.

Figure 10:
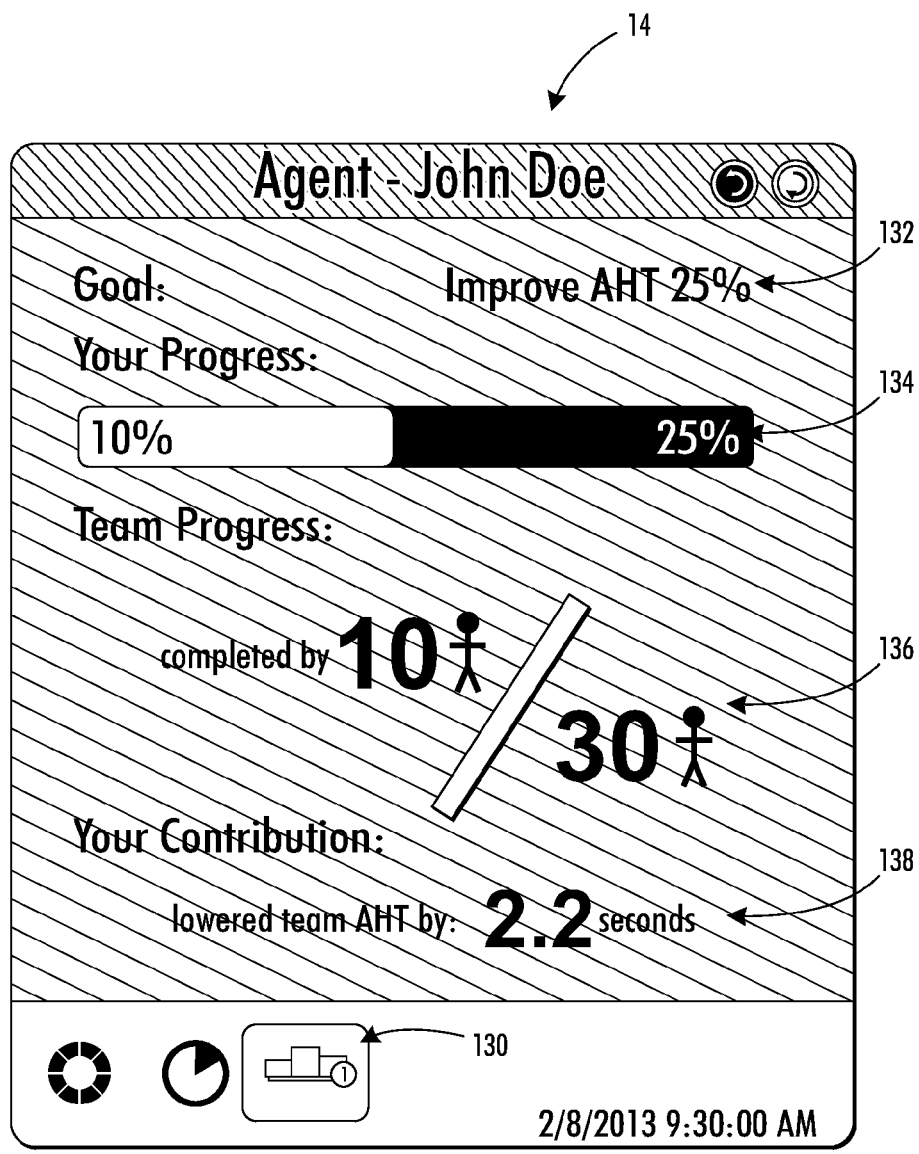
FIG. 10 is a graphical representation of an agent visual interface for display to an agent according to another aspect of the exemplary embodiment.

With reference now to FIG. 10, the agent visualization interface 14 may indicate contextual progress towards completing a competition, situating individual agent performance within the group's achievements. The example agent visualization interface 14 can show several pieces of information to the agent. First, a notification 130 on the bottom portion of the widget shows may show that there is a competition in progress. Second, at the top of the interface, the goal of the competition is given by the goal indicator 132. Below the goal indicator 132 is the individual progress indicator 134 showing the agent's progress towards the completion of the goal. The agent interface 14 also situates the agent's individual progress within the group by showing how many team members have completed the goal, at the team member indicator 136, and how the contribution of the agent can be measured against the overall performance of the team or call center, at the contribution indicator 138. The supervisor may also access the graphical visualization of each agent's interface 14 via the supervisor interface 28, e.g., by clicking on an agent's icon 140 on the interface 28 (FIG. 8).

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A system for forming contextualized competitions in a work environment:
    a performance metric computation component which receives information related to a work environment and computes a first aggregated value for a first performance metric and a second aggregated value for a second performance metric;
    a visualization component which generates a visual interface for display to a supervisor, the visual interface displaying a representation of the first and second aggregated values at a current time, a control mechanism for altering the first and second aggregated values, and a predicted effect on the second aggregated value when the first aggregated value is altered, the system providing for the supervisor to form a competition based on the predicted effect by manipulating the control for the first aggregated value displayed on the visual interface; and
    a processor which implements the performance metric computation component and the visualization component.

2. The system of claim 1, wherein the visual interface displays a status for the first performance metric which depends on the current time value of the first performance metric relative to a threshold value.

3. The system of claim 1, wherein the visual interface displays the potential contribution of an individual agent within the set of agents towards the competition.

4. The system of claim 3, further comprising a competition component which proposes a new competition based on the potential contribution of individual agents on the visual interface.

5. The system of claim 4, wherein the competition component suggests adjustments to an on-going competition on the visual interface.

6. The system of claim 1, wherein the visualization component generates an agent visual interface for displaying individualized information to an agent related to the competition.

7. A system for displaying a representation of a level of difficulty in manipulating a control mechanism for a first aggregated value for a first performance metric towards a new aggregated value for that performance metric while maintaining a second performance metric at a fixed value, comprising:
    a performance metric computation component which receives information related to a work environment and computes a first aggregated value for a first performance metric and a second aggregated value for a second performance metric;
    a visualization component which generates a visual interface for display to a supervisor, the visual interface displaying a representation of the first and second aggregated values at a current time, a control mechanism for altering the first and second aggregated values, and a representation of a level of difficulty in manipulating the control mechanism for the first aggregated value towards a new aggregated value for that performance metric while maintaining the second performance metric at a fixed value; and a processor which implements the performance metric computation component and the visualization component.

8. The system of claim 7, further comprising providing for the supervisor to form a competition based on the predicted effect by manipulating the control for the first value displayed on the visual interface.

9. A method for visualizing a predicted effect on a second performance metric when a first performance metric is altered, comprising:

receiving information related to a set of agents operating in a work environment;

with a processor, computing a first aggregated value for first performance metric and a second aggregated value for a second performance metric, based on the received information;

generating an interface for visualizing the first and second aggregated values at a current time;

computing a correlation measure between the first and second performance metrics; and on the interface, visualizing a predicted effect on the second performance metric when the first performance metric is altered, the visualizing of the predicted effect on the second performance metric when the first performance metric is altered being based on the computed correlation measure.

10. The method of claim 9, further comprising providing a control for altering at least one of the first and second performance metrics.

11. The method of claim 10, further comprising forming a proposed competition based on the altered at least one of the first and second performance metrics.

12. The method of claim 9, further comprising generating an alert when an issue with at least one of the first and second performance metrics is detected.

13. The method of claim 12, wherein the issue with the first performance metric is detected when the first aggregated value is trending negatively towards a threshold value for the first performance metric.

14. The method of claim 13, wherein the threshold value is defined by at least one of a call center and service level agreement.

15. The method of claim 9, further comprising generating a representation on the visual interface of the level of difficulty in altering the first performance metric while maintaining the second performance metric at a fixed value.

16. The method of claim 15, wherein the level of difficulty in altering the first performance metric is computed according to the slope of a regression line between the first and second performance metrics.

17. The method of claim 9, wherein the computing of the correlation measure comprises determining a Pearson coefficient.

18. A computer program product comprising a non-transitory storage medium storing instructions, which when executed by a processor, perform the method of claim 9.

19. A method for forming contextual competitions in a work environment comprising:

receiving information related to a set of agents operating in a work environment;

with a processor, computing a first aggregated value for first performance metric and a second aggregated value for a second performance metric, based on the received information;

generating an interface for visualizing the first and second aggregated values at a current time;

on the interface, visualizing a predicted effect on the second performance metric when the first performance metric is altered;

providing a control for altering at least one of the first and second performance metrics;

proposing a competition based on the altered at least one of the first and second performance metrics; and computing the potential contribution of individual agents towards the competition.

20. The method of claim 19, further comprising computing a correlation measure between the first and second performance metrics, the visualizing of the predicted effect on the second performance metric when the first performance metric is altered being based on the computed correlation measure.

21. A decision-making support tool for forming contextual competitions in a work environment, comprising:

a display device which displays:

at least one region which displays a representation of a plurality of performance metrics that are each aggregated over a population; and a plurality of control mechanisms disposed on the region, each of the plurality of control mechanisms enabling a respective one of the performance metrics to be altered;

a user input device which enables a user to adjust one of the control mechanisms to alter a respective first of the performance metrics and cause the display device to display a predicted effect on at least one other of the performance metrics when the first performance metric is altered;

a competition component for proposing a competition based on a value of the first of the performance metrics selected when the control mechanism is adjusted by the user; and a processor which implements the tool.

22. The support tool of claim 21, wherein the at least one region indicates the status of at least one performance metric.

23. The support tool of claim 21, wherein the plurality of performance metric controls comprise sliding members.

* * * * *